United States Patent [19]
Deming, Jr. et al.

[11] Patent Number: 5,500,793
[45] Date of Patent: Mar. 19, 1996

[54] COMPUTERIZED SYSTEM FOR DEVELOPING MULTI-PARTY PROPERTY EQUITY EXCHANGE SCENARIOS

[75] Inventors: Robert F. Deming, Jr., Malibu; Stephen E. Demimg, Pasadena, both of Calif.

[73] Assignee: Equitrade, Los Angeles, Calif.

[21] Appl. No.: 116,343

[22] Filed: Sep. 2, 1993

[51] Int. Cl.⁶ .................................................. G06F 19/00
[52] U.S. Cl. ............................................................ 364/401
[58] Field of Search ................................. 364/401, 408, 364/403, 406

[56] References Cited

U.S. PATENT DOCUMENTS

| | | |
|---|---|---|
| 3,573,747 | 4/1971 | Adams. |
| 4,677,552 | 6/1987 | Sibley, Jr.. |
| 4,775,935 | 10/1988 | Yourick .................................... 364/401 |
| 4,799,156 | 1/1989 | Shavit et al.. |
| 4,870,576 | 9/1989 | Tornetta. |
| 4,903,201 | 2/1990 | Wagner. |
| 5,032,989 | 7/1991 | Tornetta. |
| 5,077,665 | 12/1991 | Silverman et al.. |
| 5,101,353 | 3/1992 | Lupien et al. .......................... 364/408 |
| 5,136,501 | 8/1992 | Silverman et al. ..................... 364/408 |
| 5,243,515 | 9/1993 | Lee ......................................... 364/401 |
| 5,305,200 | 4/1994 | Hartheimer et al. .................... 364/408 |
| 5,309,355 | 5/1994 | Lockwood .............................. 364/401 |
| 5,361,199 | 11/1994 | Shoquist et al. ...................... 364/401 |
| 5,375,055 | 12/1994 | Togher et al. .......................... 364/401 |

*Primary Examiner*—Donald E. McElheny, Jr.
*Attorney, Agent, or Firm*—Kelly, Bauersfeld & Lowry

[57] ABSTRACT

A computerized, interactive system to search for and identify possible real property equity exchanges involves the establishment of a data field in an electronic data base to enable a user to develop, locate and identify property trade scenarios. A computer is utilized to process data from a plurality of sources, each providing specifics of the owner's exchange desires and the current property's characteristics. The computer reviews trade location desires of the property owner and finds potential trades from the location of other tradable properties. There need not be a direct match or a reciprocal match between two properties for a possible property exchange to be identified. The system allows identification of exchange scenarios involving many different properties, wherein the exchange scenarios can be circular or open ended.

40 Claims, 21 Drawing Sheets

Before Transaction

After Transaction

Before Transaction

After Transaction

Fig. 19

```
Press <Ctrl V> to exit, <F3> to view desired trades

EQUITRADE Listing #100001
Property Address:
1812 Verona Place                              Location: FOOTHILLS
LOS ANGELES         CA      91141                  Zone: SINGLE BUILT
                                     Tax Classification: 1034
                                             Trade Type: ANY
Trade to:
   1   MALIBU           CA      BEACHFRONT
   2   LONG BEACH       CA      NR BEACH
   3   BRONX            NY      CITY
Financial:
 Encumb:       80,000        Median Price        Est Taxes:      3,000
 Equity:      130,000        for Location:        Est Exp:       5,000
  Price:      210,000            175,000
Agent:
TREBOR G. NIMED
NIMED AND ASSOC.                        Listed:  Y  #123-45-999
111 NORTH MAIN                          Board:
PASADENA        CA      91703           GLENDALE
Phone: (999)555-1212
  Fax: (999)555-2121
```

Fig. 20

```
EQUITRADE Property Trade Search System - Working for TREBOR G. NIMED
  Selected Properties for Current Trade   Possible Matching Trades:
+--- My property --------------------+  +---------------------------------------+
| 100001 1812 VERONA PLACE           |  | 100002 920 EAST WASHINGTON BLVD  #414 |
|        LOS ANGELES CA              |  |        PASADENA CA               Yes  |
+------------------------------------+  | 100003 123 SOUTH MAIN STREET          |
     Might trade to...                  |        LONG BEACH CA             No   |
                                        |                                       |
                                        |                                       |
                                        |                                       |
                                        |                                       |
                                        |                                       |
                                        |                                       |
                                        +---------------------------------------+
```

Fig. 21

```
+-----------------------------------------------------------------------+
|EQUITRADE Property Trade Search System - Working for TREBOR G. NIMED   |
| Selected Properties for Current Trade   Trade Property Analisis       |
|+-- My property --------------------+ +-------------------------------+|
|| 100001 1812 VERONA PLACE          | |                               ||
||        LOS ANGELES CA             | |                 Property Id # ||
|+-----------------------------------+ |             100001    100003  ||
|+-- Might trade to -----------------+ |             ------    ------  ||
|| 100003 123 SOUTH MAIN STREET      | | Asking Price:  210000    300000 ||
||        LONG BEACH CA              | |                               ||
|+-----------------------------------+ | Mortagage:      60000    100000 ||
|+-- Might trade to -----------------+ | Other Leans:    20000     10000 ||
|| 100004 5119 EVERGREEN LANE        | |             ------    ------  ||
||        LISLE IL                   | | Reputed Equity: 130000   190000 ||
|+-----------------------------------+ |                               ||
|    Might trade to my property.       |                               ||
|                                      | Analysis:                     ||
|                                      |    Buyer may need $    60000  ||
|                                      |    cash to assume mortagage for||
|                                      |    $     100000 of property # 100003||
|                                      |                               ||
|                                      +-------------------------------+|
+-----------------------------------------------------------------------+
```

COMPUTERIZED SYSTEM FOR DEVELOPING MULTI-PARTY PROPERTY EQUITY EXCHANGE SCENARIOS

BACKGROUND OF THE INVENTION

The present invention relates generally to computerized real estate transactions. More particularly, this invention relates to a computerized searching system for locating multi-party property equity exchanges, developing potential trade scenarios, tracking the details of those scenarios, and helping to analyze the results.

Basic to an understanding of real estate transactions is that the title of real property is owned and the value of the ownership is generally the equity in the real property. If a buyer wishes to acquire ownership of real property, the following conditions must be satisfied: the buyer must be interested in the property, the buyer and seller must agree to the amount of the seller's equity in the property, and the buyer must have access to sufficient liquid capital to meet the agreed-upon sales price. The sales price typically consists of two components: (1) the outstanding encumbrances, and (2) the equity that has been accumulated. As long as the real estate market is strong, the seller is able to pay off the encumbrances and still retain some cash. Unfortunately, if the real estate market is weak, the seller may find that the market value of the property is unable to provide the desired profit from the sale. In extreme cases, the selling price of a property may not even be able to cover the encumbrances. In addition, if the buyer does not have the liquid capital to purchase the property, a transaction cannot occur. Often the buyer is the current owner of another property and the ability to buy a new property is dependent on the ability to sell the old property. Sale of the old property is a condition precedent to the purchase of the new property, due to the need for liquid capital to complete the proposed transaction. The importance of this requirement can be reduced if the reliance on liquid capital is minimized, thereby allowing more real estate transactions to occur.

Through the years, Congress has passed a series of legislative measures which have allowed the transfer of property from one owner to another to be "tax delayed" as long as the profits realized from the transfer were reinvested in a similar category of property within specified time periods. Since their implementation, these measures, as embodied in the tax codes, have encouraged creative real estate industry participants to establish trades between the owners of two properties without requiring large amounts of liquid capital to be available. The key feature in making these trades workable is that both parties must agree upon the amount of equity being traded. Occasionally one party will bring two properties into the trade to approximate the amount of equity presented by the other party. Of course, trades involving three or more parties are possible. All of these situations, however, rely on real estate agents who have access to a large number of property owners interested in potential trade situations.

Traditionally, for potential buyers and agents to become aware that a property is for sale, analysis of magazine advertisements, multiple listing publications, newspaper advertisements and word of mouth information was required. Today, however, electronic data systems have been established which help real estate agents learn of locally available properties. The agents using these systems are able to qualify the data retrieved by specifying price range, location and other physical characteristics. Such systems are usually designed to work only within their own communities and provide no automated way of exchanging data with other remote locations. Some nationwide data bases do exist, but they tend to cater to a large audience with a variety of interests and rely on the operators to properly select the desired information to be returned.

Those dealing in real property trades do so by making personal contact. This requires that the desires of two or more individual property owners and their mutual equity positions be known to an interested party, usually an agent, who becomes an information link. Such agents can make use of the existing information systems for finding or locating potential real estate transactions but, unfortunately, these systems focus on sales price and physical characteristics as the primary items for researching properties. To compensate, agents involved in real estate trades must maintain additional records about tradable properties, including where property owners might be willing to trade. Of course, two property owners interested in trading may not be interested in each others property. For example, one owner wants to use its equity to acquire another property. The second property owner, however, does not want to use its equity to acquire the first property, but is interested in a property elsewhere.

Accordingly, there has been a need for a system which increases the ability of an agent to evaluate potential trade scenarios. Preferably, such a system would be capable of developing potential trade scenarios, tracking the details of those scenarios, and helping to analyze the results. The potential trade scenarios would be developed by using a list of locations where property owners would be willing to move and comparing that list against the locations of other properties in the system. Moreover, there is a need for such a system which is useful to real estate agents in an environment in which available liquid capital for the purchase of real estate is reduced. The present invention fulfills these needs and provides other related advantages.

SUMMARY OF THE INVENTION

The present invention resides in a novel method for developing multi-party property equity exchange scenarios. In accordance with the invention, the method comprises the steps of providing an electronic data base of properties available for trade. The electronic data base is accessed, and a base property is identified for which a trade is desired. Criteria are defined for matching properties in the electronic data base, after which the properties in the data base are compared with one another and with the base property in accordance with the established criteria. A list of possible trade scenarios is created involving two or more properties in the electronic data base, including the base property, which are displayed for analysis.

A computerized searching system utilizing the present invention is useful in identifying possible multi-party trade scenarios. Property owners may advantageously utilize the computerized searching system of the present invention for improving the possibility of using the equity a property owner has in its property as a means of exchange without waiting for the property to be liquidated. Essentially, the present invention provides a vital information link necessary to arrange possible property trades based on the equity in such properties. Property trades possible utilizing the present invention include direct swaps, multi-lateral trades (i.e., circular trades), or single direction transactions.

In a preferred form of the invention, a method for developing multi-party real property equity exchange scenarios involves, first, the identifying of a base property to be traded. Part of this identification process requires that the value of the base property be ascertained, as well as any encumbrances thereon. Next, criteria must be established which must be met in order for the owner of the base property to trade it. This includes, naturally, steps specifying a desired trade location and defining an acceptable equity difference between properties to be matched. The owner of the base property must indicate acceptable locations for property to be received in exchange for the base property. Alternatively, the owner of the base property may want to indicate that payment in cash would be acceptable as well. By specifying an acceptable equity difference between properties to be matched, the owner of the base property establishes limits on the amount of cash available to supplement the equity in the base property.

An electronic data base of properties available for trade is provided. Each of the properties listed in the electronic data base includes criteria to be satisfied in order to trade each of said properties. This includes the listing of a value for and the encumbrances on each property, defining an acceptable equity difference between properties in the data base to be matched, and specifying a desired trade location for each property in the data base, as specified by the owners of such properties.

The electronic data base can be accessed by entering a base property to be traded into the data base. Thereafter, a search is conducted of information stored in the electronic data base to establish matches between properties within the electronic data base, and the base property and properties within the electronic data base, all in accordance with the established trade criteria for each. This involves a comparison of the base property against other properties in the data base, and the creation of possible trade scenarios involving the base property and one or more other properties in the electronic data base. As possible trade scenarios are found, they are electronically recorded.

The search results are then analyzed by displaying the possible trade scenarios developed. The trade criteria for the base property, as well as the other properties located in the electronic data base, may be modified after viewing a display of the possible trade scenarios for purposes of further limiting or broadening the search. This edit procedure permits the base property to be re-compared against other properties in the electronic data base which, in turn, permits new possible trade scenarios to be created and then displayed for re-analysis.

Various scenarios can be analyzed, comparing the equity of each significant property in order to understand the financial difference between the subject properties. The scenarios are analyzed to determine the likelihood of a particular possible transaction with the understanding that all of the properties have been entered into the data base as "ready-to-trade." It is possible to even substitute hypothetical "connecting properties" to assess possible trade scenarios utilizing the present invention.

The search of the electronic data base may be conducted in accordance with either a forward or a backward search technique. The search direction determines how the system looks at the data in the data base. In the forward search, the base property trade criteria is analyzed and compared against the data in the data base. Conversely, in the backward search the trade criteria of all of the other properties in the data base are compared against the base property's location.

Access may be restricted by requiring users to input an additional property to be traded, into the electronic data base prior to permitting access to other properties in the electronic data base. In this case, all of the information needed to fully evaluate the property is required, including the purported equity of the property and desired trade location of the owner. The electronic data base may be accessed utilizing electronic transmissions from a location remote from the electronic data base.

The method of the present invention and the computerized searching system disclosed permits the possible trade scenarios to be displayed on electronic screens, transmitted to remote locations via electronic media, and/or printed.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 19 is a sample computer screen showing information about a base property and its trade criteria;

FIG. 20 is a another sample computer screen showing information about matching properties selected in accordance with the method of the present invention, which properties match in location to the subject base property's trade criteria; and FIG. 21 is a another sample computer screen showing an analysis of the financial information relationship between two properties matched in a proposed real estate trade scenario.

DETAILED DESCRIPTION OF THE PREFERRED EMBODIMENT

Figure 1A:
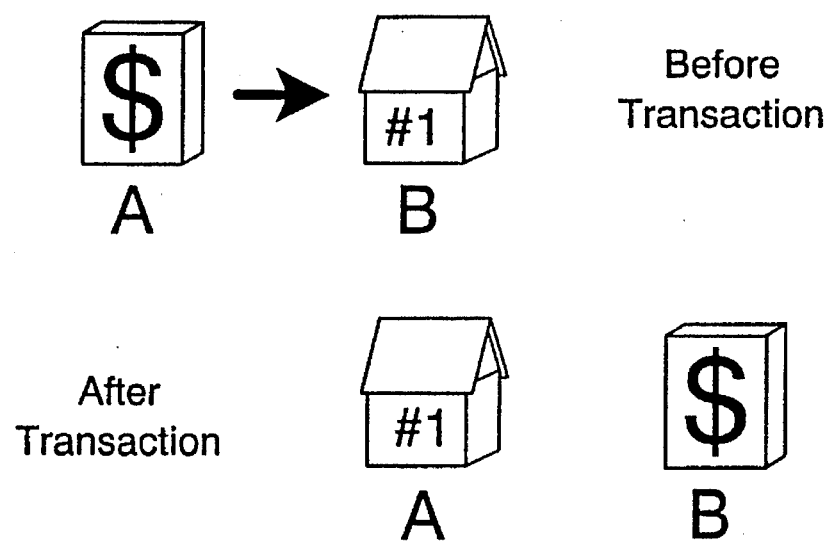
FIG. 1A illustrates a typical real estate sale transaction wherein two parties, represented by the letters A and B, agree to the sale of property #1 for cash.

As shown in the drawings for purposes of illustration, the present invention is concerned with a computerized searching system for developing multi-party real property equity exchange scenarios. The overall concept of the computerized searching system is shown best in FIGS. 5, 6 and 7. Broadly speaking, the computerized searching system involves identifying a base property to be traded and establishing criteria for trading the base property. An electronic data base of properties available for trade is provided, which include criteria to be satisfied in order to trade each said property. This electronic data base is accessed, typically by inputting the base property and the criteria for trading the base property, and a search is made of all properties in the electronic data base for matches between properties within the data base itself, and the base property and properties within the data base. The search creates possible trade scenarios involving the base property and one or more other properties in the electronic data base. These possible trade scenarios are displayed for analysis, and the criteria utilized during the search process can be modified to either narrow or broaden the scope of possible trade scenarios.

The process of locating possible real property equity exchanges could hasten activity in the real estate market. People could use the equity in their homes without waiting to sell their homes. Pertinent trade information is the liquefier which would replace money in the series of transactions necessary for a person to sell one property and buy another. Already in place are the homes, the rote information networks, the buyers, the sellers, the presumed equity, the representatives, and the various real estate professionals. The current liquefier to make the above groups move and interact is money. The availability of money relative to demand is the degree to which the property and its equity can be purchased from sellers by buyers using cash. The present invention will assist those desiring to sell property by reducing the role of and need for cash.

In order to provide a better understanding of basic real estate transactions, reference is made to the drawings. First, with respect to FIG. 1A, the traditional scenario of property acquisition is illustrated. In this figure, two parties are represented, A and B, in which A currently possesses capital and is interested in buying a property, and B owns property #1 and is interested in selling. With the assumption that party A is interested in property #1 and can reach an agreement on the purchase price, a transaction will occur. This transaction will result in A being the owner of property #1 and B possessing the capital provided by A.

Figure 1B:
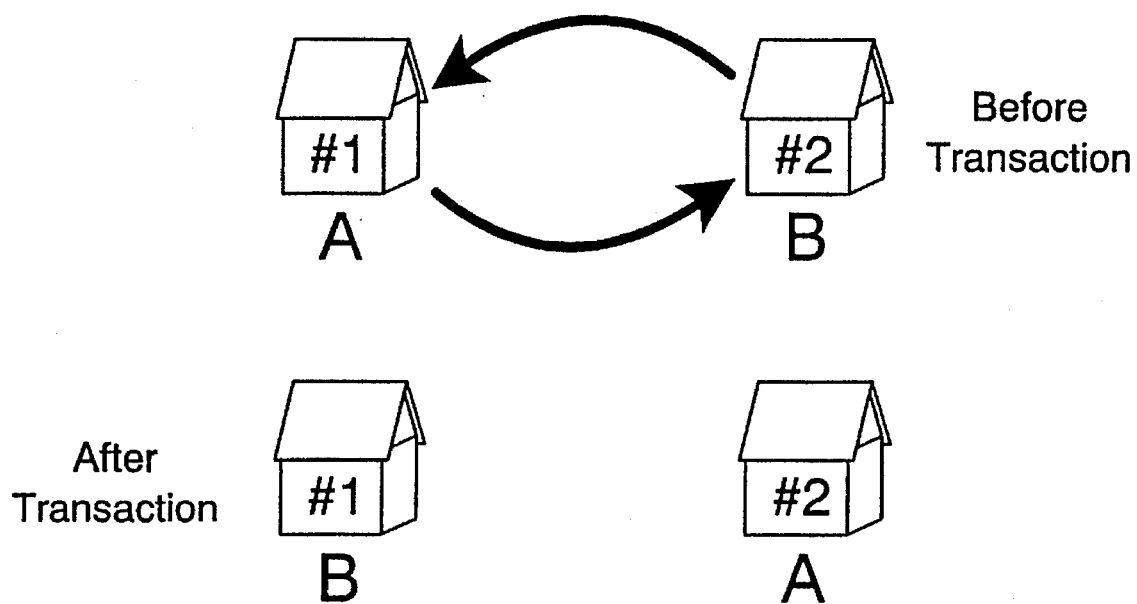
FIG. 1B illustrates a basic, reciprocal real estate trade.

In FIG. 1B an example of a basic trade scenario is represented. In this scenario there are two parties, A and B, who own properties #1 and #2 respectively. In order for a trade transaction to occur between these two parties, A must be interested in property #2, B must be interested in property #1, and the recognized equities in the two properties are agreed to be equal. For example, party A has a home with a market value of $100,000; existing encumbrances totaling $70,000 for a presumed equity (recognized upon the sale) of $30,000. Let us then say party B has a home with a market value of $60,000 and existing encumbrances of $30,000 for a presumed equity (again recognized upon the sale) of $30,000. A likes B's house; B likes A's house. With these conditions met, A would become the owner of property #2 and B would become the owner of property #1. Sometimes, additional capital may be required from one of the properties in order to balance the equities between the two parties. By fully implementing the system of the present invention, users will be able to find basic scenarios like this with greater ease and frequency.

Equity is the liquefier in the example of FIG. 1B. That which makes the equity positions of each party and their desires known is the passage of information. Information becomes the liquefier in the above described instance. Rather than A waiting for someone, X, to purchase its home in order to purchase B's home and perhaps waiting for X to have sold its home, etc., A, due to the passage of information, finds B. A and B found each other by making three key things known: that their houses were for sale; the values of their homes, including their equity positions; and what their desires were upon the sale of their homes. A was made aware that B was ready, willing, and able to buy A's home, and vice versa. In this very simple example virtually no cash was needed for each party to acquire a home which they would happily move into.

The computerized searching system for developing multi-party property equity exchange scenarios, improves the exchange of information so vital to arranging trades. With modern electronic communications and information processing we can help more Bs find As, and vice versa. Beyond that, the system of the present invention will help A find some other home if it does not like B's home and B still likes A's home. For example, the system will find C's home. To illustrate, the system will help B find A, A find C, and C find B. The process gives each party an improved information system. It is believed that the computerized searching system, properly implemented, should have a positive influence on sales activity in a given market. The requirement is to have a system in place which makes easier and more efficient the collection, processing and passage of information relative to the possibility of direct real estate trading. With the information properly processed— various, far more sophisticated scenarios than the above described scenarios are possible.

Figure 2:
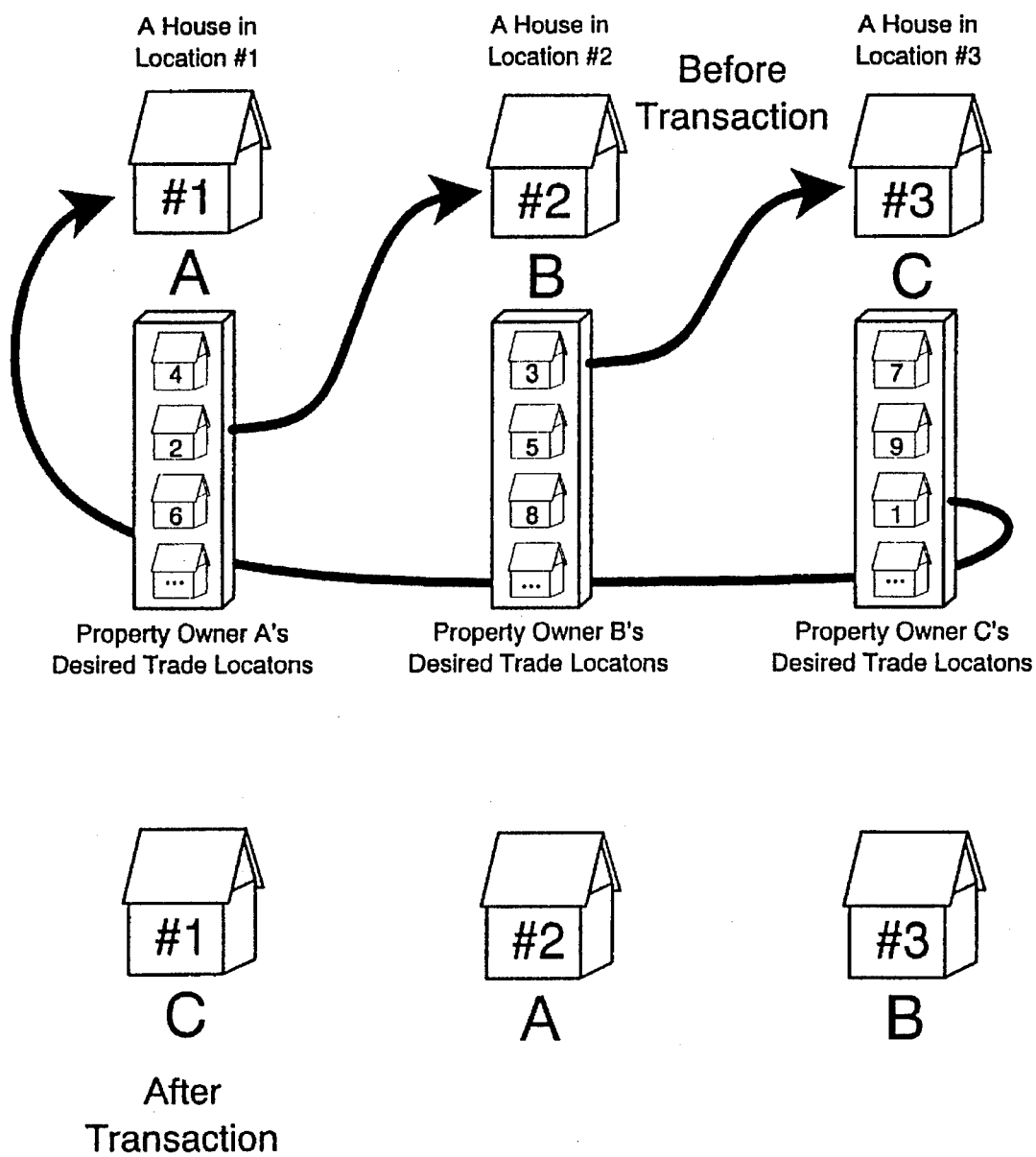
FIG. 2 illustrates an exemplary multi-party (i.e., three or more party) real estate trade.

FIG. 2 shows a possible transaction involving three (or more) parties. Party A is shown to be the owner of property #1 and is also shown to have an interest in moving to one of the locations #4, #2, #6, etc. Similar information is presented for parties B and C. Utilizing the present invention permits all of this information to be properly recorded in a computer data base which allows flexible access in analysis to enable more elaborate trade scenarios to be identified.

The computerized searching system causes the computer to search on behalf of one of the property owners—perhaps property owner B. In the scenario shown in FIG. 2, the computerized searching system will generate screens like those shown in FIGS. 19–21. Owner B wants to move to areas including #3, #5 and #8. Owner B prompts the computer to first find if there are any properties in the desired trade areas #3, #5 or #8 who are interested in trading. The computer responds with all of the matching properties and then indicates those properties where the owners are interested in trading back to the location of property #2. B can pursue one of the direct trade scenarios or can prompt the computer to find larger scenarios. By selecting a property that does not trade directly back to property #2, for example owned by C in area #3, the computer will then select all of the matching properties in the data base with the desired locations of owner C. This list is also scanned for properties that match back to area #2. Again, selection of one of the matching properties completes the trade scenario while selection of any of the other properties can result in an even larger trade scenario.

In order for the trade transaction scenario to work in FIG. 2, A must recognize the equity in B's property #2, B must recognize the equity in C's property #3, and C must recognize the equity in A's property #1. When these conditions are met, A becomes the owner of property #2, B becomes the owner of property #3, and C becomes the owner of property #1. Of course, additional capital may be required by one or more parties to balance the equities. The real estate trade searching system described would also assist in finding and documenting possible trade scenarios of this type.

Figure 3:
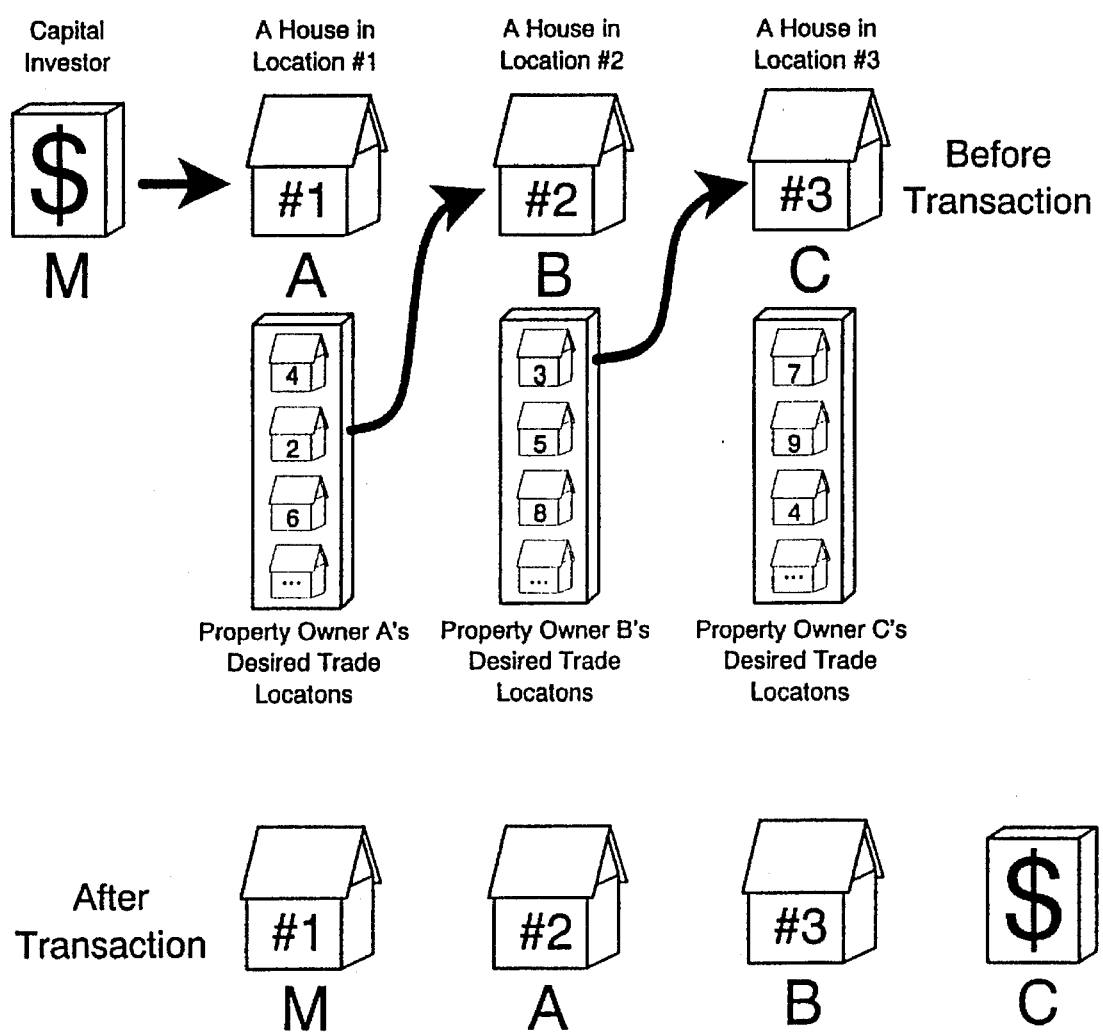
FIG. 3 illustrates an exemplary multi-party, single direction trade similar to that illustrated in FIG. 2, with the exception that cash is introduced in order to complete the transaction.

FIG. 3 illustrates what would be referred to as a "single direction, cash out" scenario. Because the trade scenario documented in FIG. 2 can be difficult to complete, it may be necessary for one of the parties to find cash to purchase its property. For example, A, in area #1, wants to move to areas #2, #4 or #6. A finds in the data base that B in area #2 is tradable but does not want to move or trade to area #1. Owner A prompts the computer to continue searching and finds that C in area #3 desires to trade as well, but not back to A's location. This scenario could be continued or A could end the search with the three component properties. One of the involved parties must know of a cash buyer for A's property and that property owner C is willing to take cash for its property. C will thus be "cashed out".

The real estate trade searching system may present a scenario where the trade location desires and equity positions of the parties A, B, and C are as described in FIG. 2, with the exception that party C does not desire location #1. This is resolved by introducing party M who, with capital, is interested in the property in area #1. This capital then is "passed through" the traders and ends in the possession of party C. Using another approach, the equity trades between the parties may be completed with additional amounts of capital being introduced by several of the trading parties as long as the total amount of capital plus equity and cash is equal to C's equity.

Figure 4:
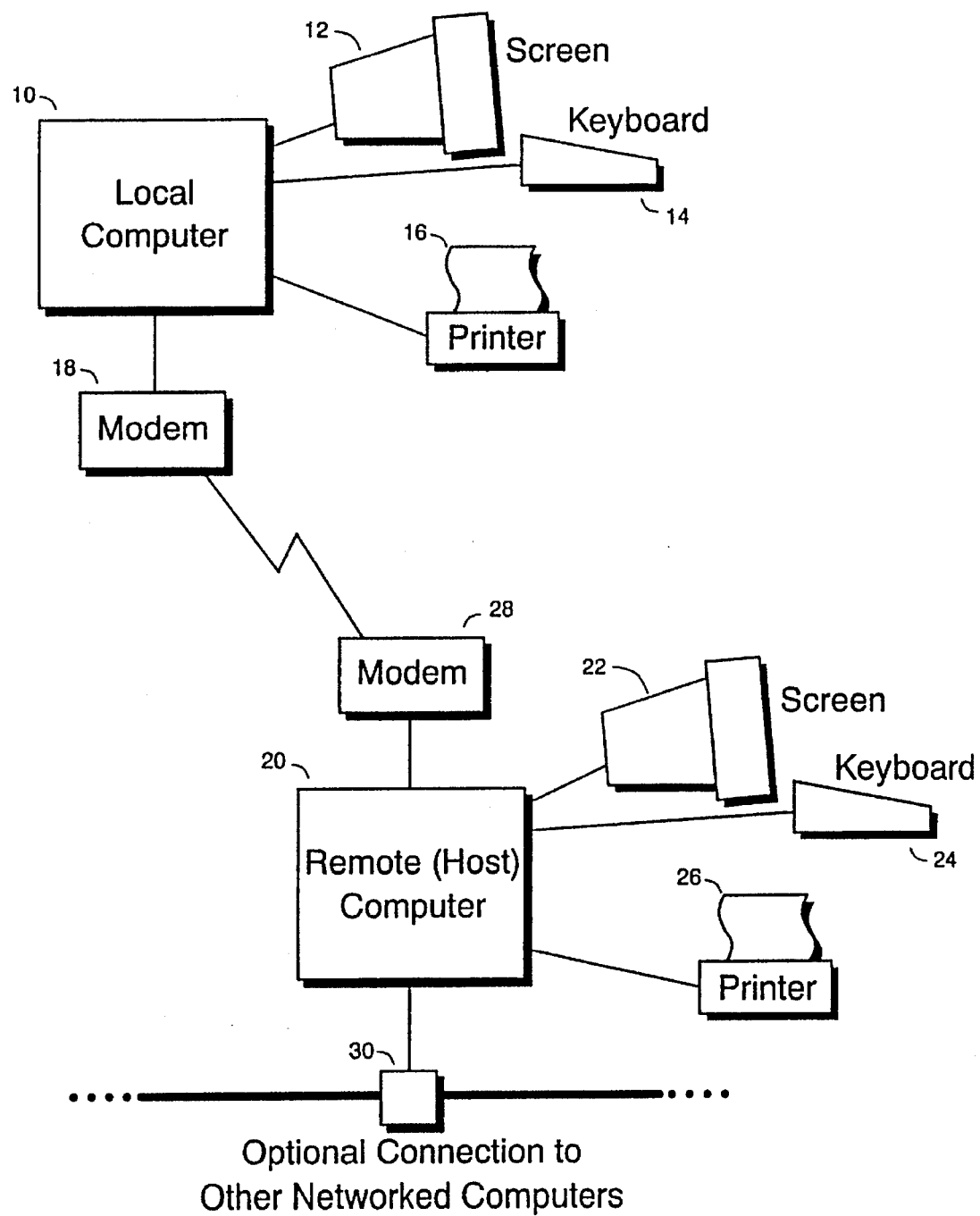
FIG. 4 is a diagrammatic representation of the relationship between the a central (host) computer and a remote (user) computer which may be utilized in connection with the present invention.

FIG. 4 illustrates the connection of remote and local computers. Although, both the remote and local computers have the same types of components (computer, screen, keyboard, printer, and modem), they each serve a different function in the trade searching process. The host computer's purpose is to allow electronic access to the system for users/subscribers. There will be a plurality of local computers 10 with similar configurations each able to access the host computer 20 via a modem 18. Information received by the modem 18 will be presented on a screen 12 and a printer 16. Information entered on a keyboard 14 will be returned to the host computer 20 with the same modem 18. The host computer 20 will perform the actual trade searching functions for the users. There are preferably a plurality of host computers 20, each able to receive, process, and respond to the requests from the local computers 10 via a modem 28. Maintenance, data entry, and billing functions are performed utilizing the attached screen 22, keyboard 24, and printer 26. Information shared by multiple host computers 20, would be communicated via a network connection 30.

The host computer 20 should be a computer which balances low cost with capability and flexibility. A computer 10 is also required for the user of the system if remote communication with modems 18 and 28 will be used. A network is typically not a required component if a mainframe or minicomputer is being used, since one computer can provide multi-user access. In order to have two smaller host computers 20 share information automatically, a network of some type is usually implemented.

The choice of the modems 18 and 28 is limited to budget and the maximum, desired communications speed. Although current modems can communicate anywhere from 300 baud to 14.4 kilobaud, a modem in the 2400 to 9600 baud range would work for this arrangement. To provide maximum compatibility, the modem should be Hayes compatible.

In addition to the hardware, several items of software must be in place as well. Such software may include commercially available BBS (bulletin board system) communication software, networking software, and remote user terminal software. Also, a data base searching program as described below in detail, is required to implement the present invention. The choice of a host data base software package will be dependent on several factors including the hardware platform, the number of simultaneous users, the desired access speed and the cost.

Figure 5:
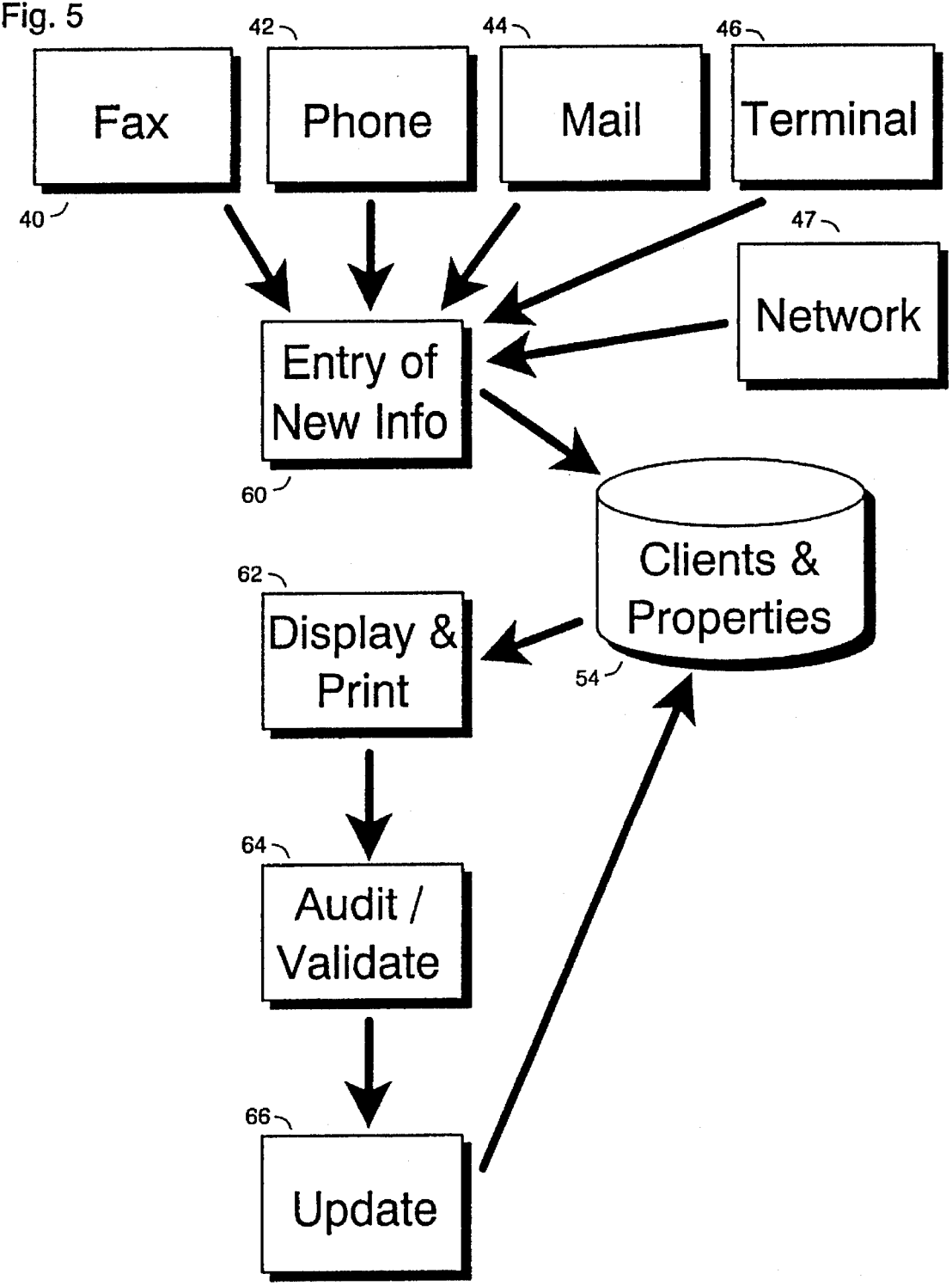
FIG. 5 is a schematic representation of the general flow of information into an electronic data base in accordance with the present invention.

FIG. 5 shows a basic block diagram of the flow of information for the data entry process. This procedure involves the collection of information about available properties and where the owners would like to trade, analyzing the collected data for possible trade matches, and presenting the information in forms that are useful to the property owner. Initially, information is gathered from a plurality of sources. An owner might communicate its property information and trade desires by sending filled out forms by a fax 40 or by mail 44. The owner might call by phone 42 in which case an operator would enter the information directly into the computer. Computer terminals 46 and other data networks 47 would be techniques where the owner could directly enter its information into the system electronically.

The gathered information will be entered at (block 60) into the computer system's clients and properties data base 54. Information to be entered into the data base 54 includes the property owner's desired trade locations, and information regarding the subject property including, but not necessarily limited to, location, equity and asking price. After the initial entry a summary of new information should be printed 62. This information is then audited 64 by visual inspection, cross referenced sources, and direct contact with the property owner. Any corrections discovered are entered as updates 66 back into the clients and properties data base 54.

Figure 6:
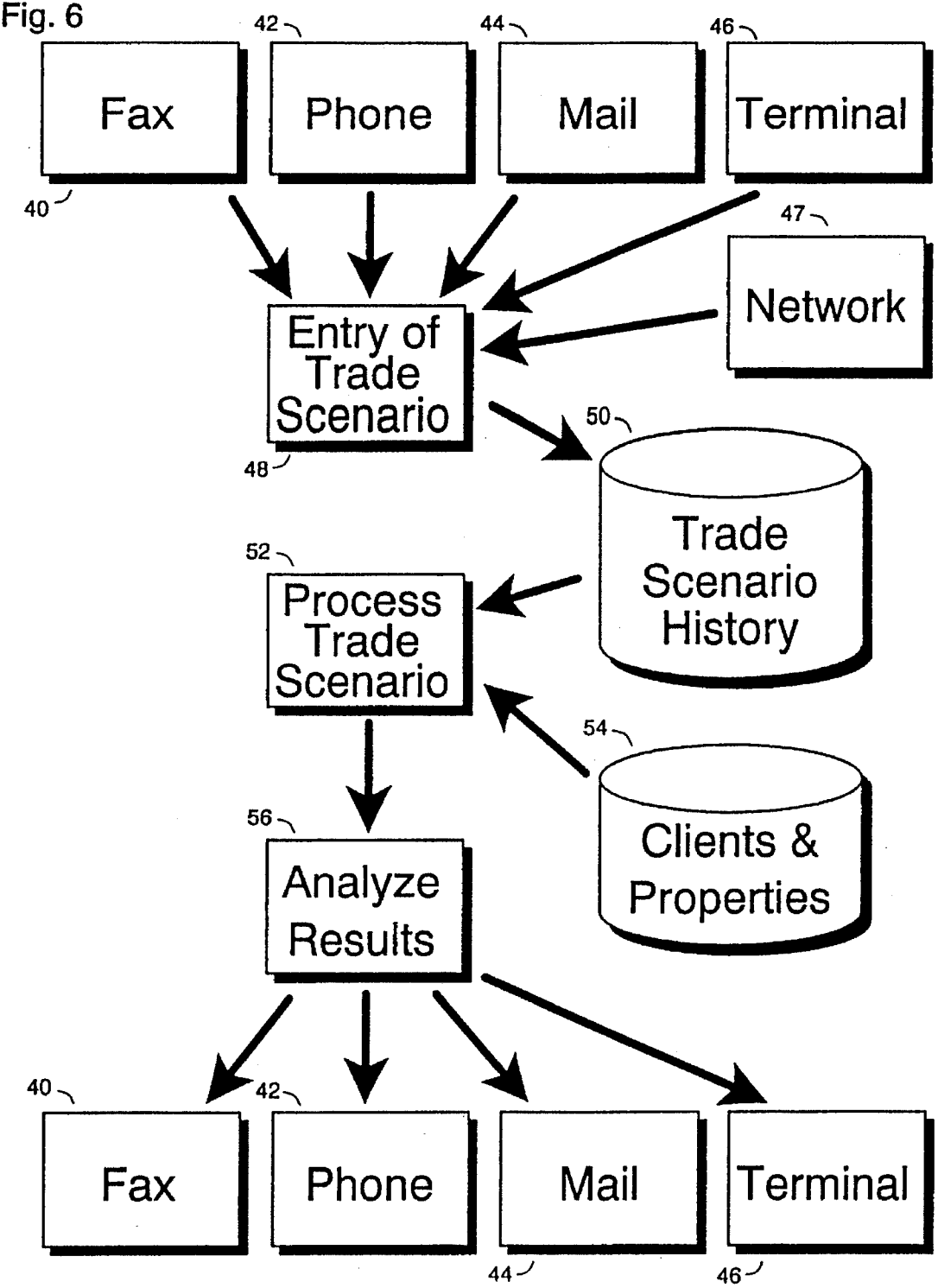
FIG. 6 is a schematic representation illustrating, generally, a method for developing multi-party real property equity exchange scenarios in accordance with the present invention, showing the general flow of information being processed from the electronic data base.

FIG. 6 illustrates, in comparison with FIG. 5, the other side of the system for the flow of information back to the user. Initial requests for information come from faxes 40, phones 42, mail 44, and computer terminals 46. These requests for information are entered at 48 into the system and define a trade scenario data base 50. As the requests are entered at 48, processing 52 of the data from the trade scenario data base 50 and the client and property data base 54 is performed. The results of the processing 52 are analyzed at 56 and returned back to the user via faxes 40, phones 42, mail 44 and computer terminals 46. FIGS. 5 and 6 show, broadly, the basic concept of the present invention.

Figure 7:
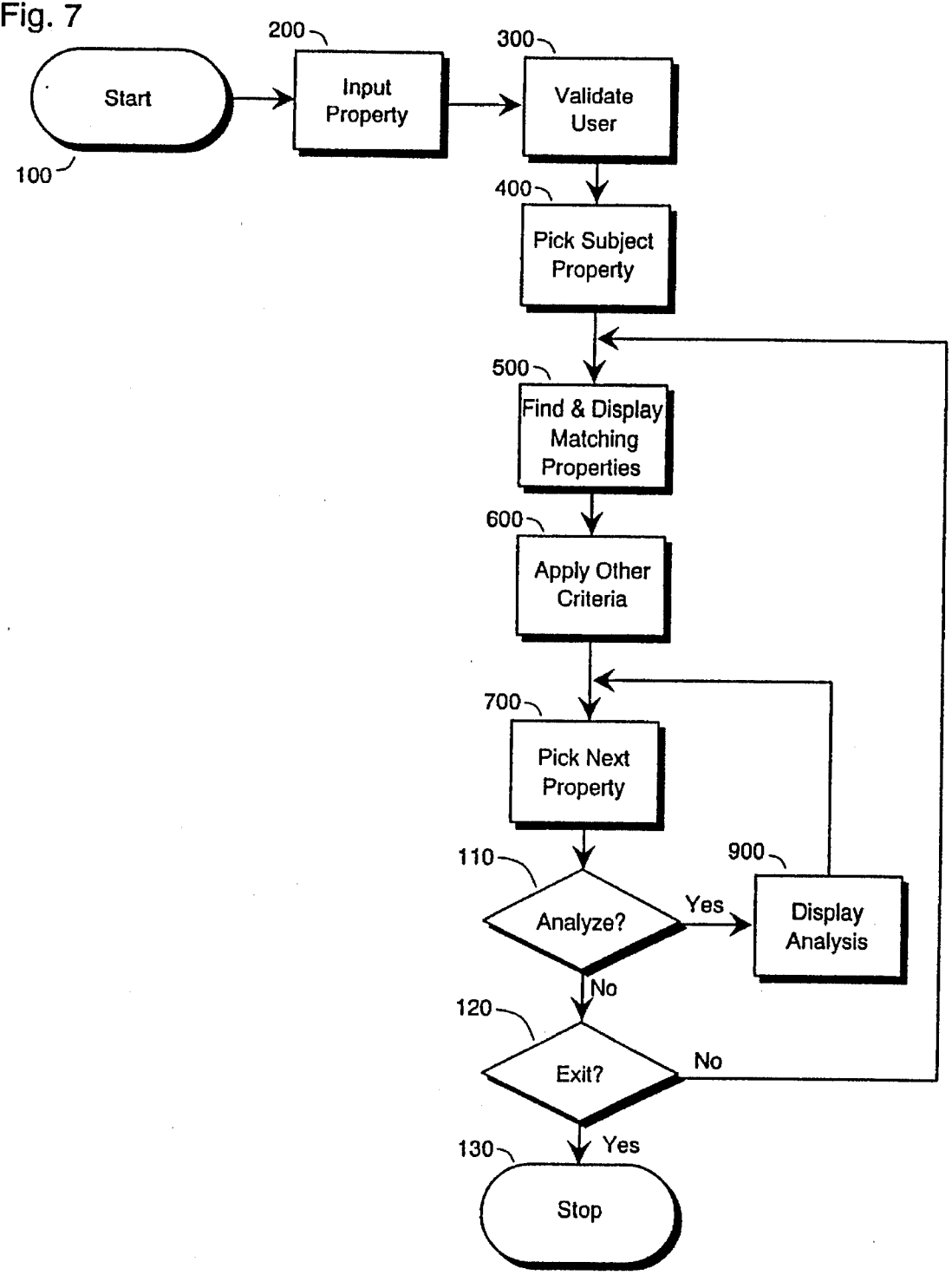
FIG. 7 is a flow chart illustrating a preferred method for developing multi-party property equity exchange scenarios, including the concepts schematically illustrated in FIGS. 5 and 6.

In accordance with the present invention, FIG. 7 gives an overview of the entire program used to implement a real estate trading system. The program starts from block 100 and proceeds to determine if the user has any new data to enter or edit in block 200. Once the entry/edit process is complete, the routine will validate the current user by checking for any available, tradable properties in block 300. If the user represents any properties, those properties would be listed in block 400 and the user would be requested to start its search session from one of them. This property which is selected to start the search session is referred to as the base or subject property. Using the base property as the current focus property, block 500 will find all matching properties in the desired search direction. The display and application of additional selection criteria will be performed in block 600 to present the user with a manageable list of tradable properties.

The user then selects a property from the list in block 700 or requests to perform an analysis. Block 110 determines if an analysis was requested and directs the program to the analysis routine block 900. Once the analysis is complete the program will return the user to select another property in block 700. If no analysis was required, the system determines if the user wants to exit in block 120. If the user does not wish to exit, a new focus property is determined and the system returns to block 500 to repeat the searching steps. If the user requests to exit, the program will stop with block 130.

Figure 8:
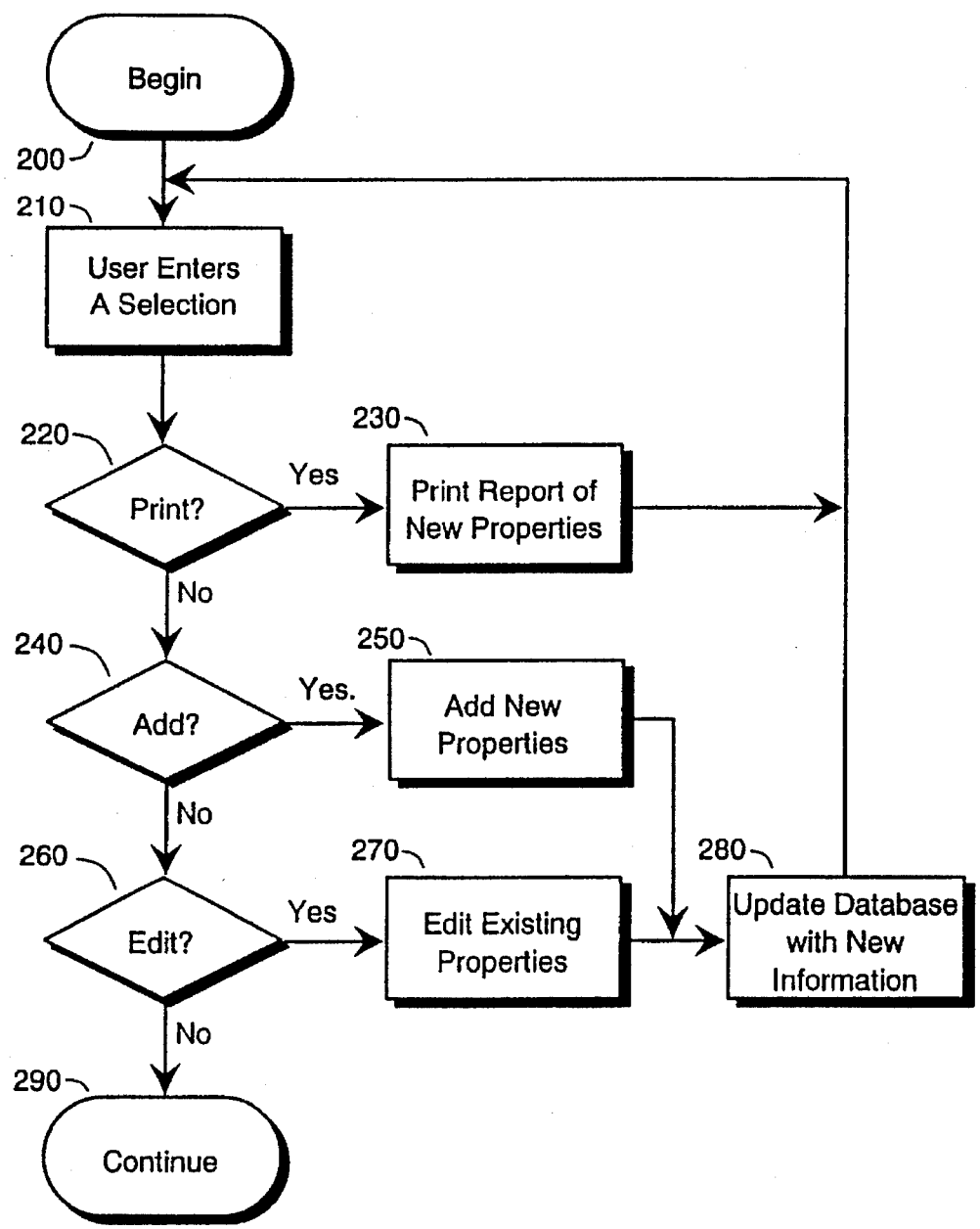
FIG. 8 is a flow chart illustrating the steps taken during the "input property 200" block shown in FIG. 7, wherein the steps for entering, editing and listing new property entries is diagramed.

The routine for entering, editing, and listing new entries is diagrammed in FIG. 8. The routine starts at block 200 and requests a selection of the function to be performed in block 210. Block 220 determines if printing was requested and produces a listing of the new entries in block 230. Once the report is complete, the user is prompted again for the function to be performed in block 210. If add was the selected function, block 240 directs the program to get the information about a new property in block 250, which is then used to update the client and properties data base 54 in block 280. With the update complete, the user is again prompted in block 210 for the next function. In block 260 the final decision is made about any editing that needs to occur in block 270. The edited information is passed onto block 280 and the program returns for the next function in block 210. If no printing, adding, or editing functions are requested, the program exits this routine in block 290.

Figure 9:
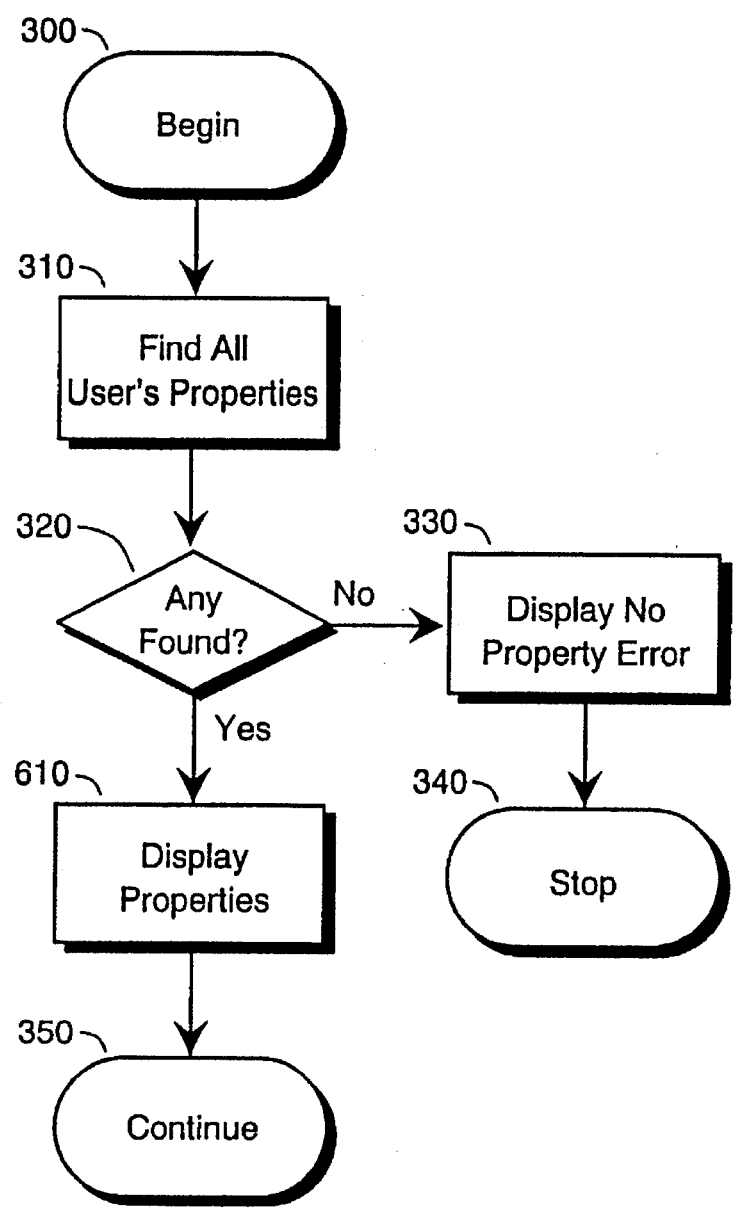
FIG. 9 is a flow chart illustrating the steps in the "validate user 300" block shown in FIG. 7, wherein the validity of a users right to access the system is determined by the existence of properties on the system that the user represents.

FIG. 9 illustrates that the validity of a user's right to access the system is determined by the existence of properties on the system that the user represents. This routine begins in block 300 to compile a list of the properties represented by the user in block 310. Block 320 determines if the list is empty, in which case, the program displays an error from block 330 and stops in block 340. If the list is not empty, block 610 (FIGS. 14 and 15) displays the list and the routine continues from block 350.

Figure 10:
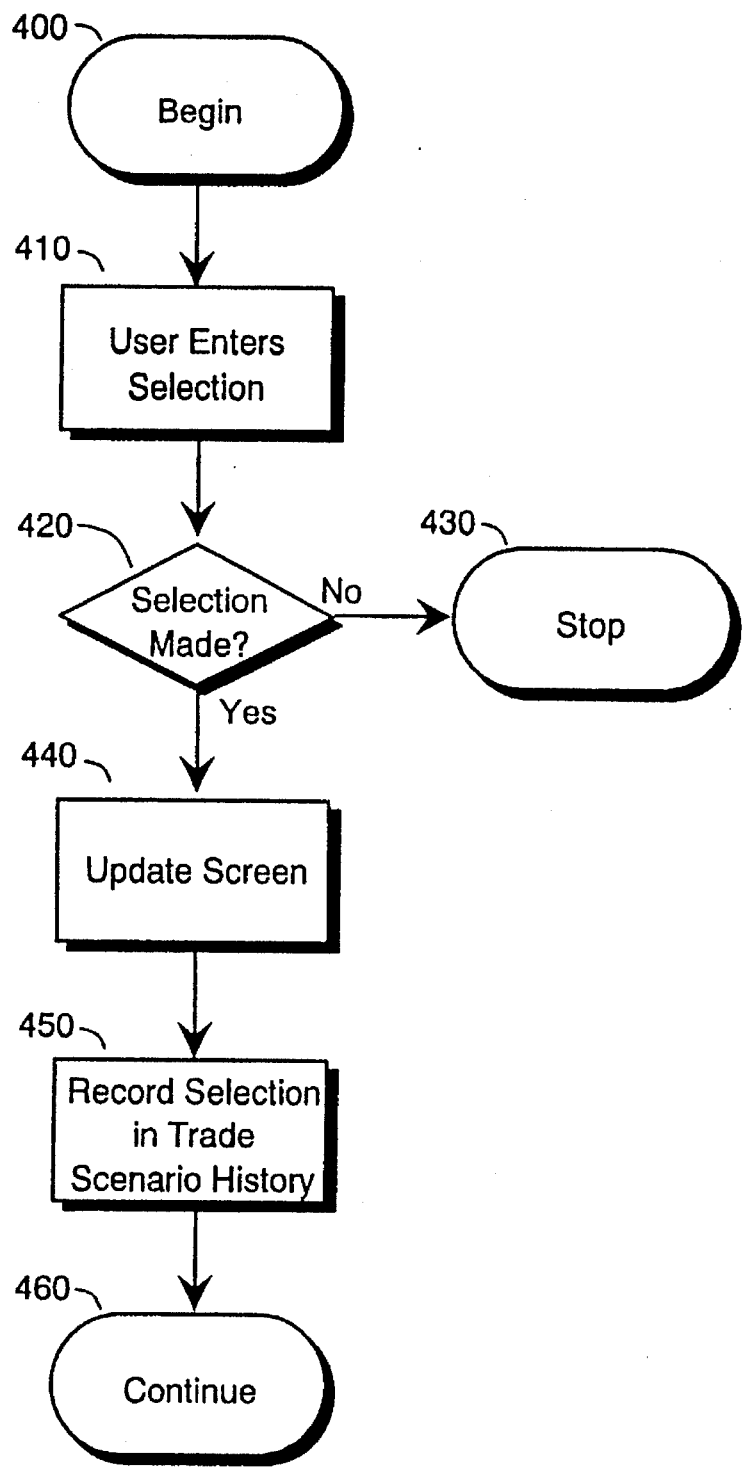
FIG. 10 is a flow chart illustrating the steps comprising the "pick subject property 400" block of in FIG. 7, showing a method by which a subject or base property is determined from the list of properties represented by the user.

Referring to FIG. 10, the subject property is determined from the list of properties represented by the user. From block 400 the routine prompts for the selection of one of the available properties and the user responds in block 410. If no selection is made, block 420 directs the routine to stop in block 430. Block 440 will be performed if any of the properties were selected by updating the screen with the selected property listed in a trade set section. The property is also recorded in the trade scenario history data base 50 by block 450 before continuing from block 460.

Figure 11:
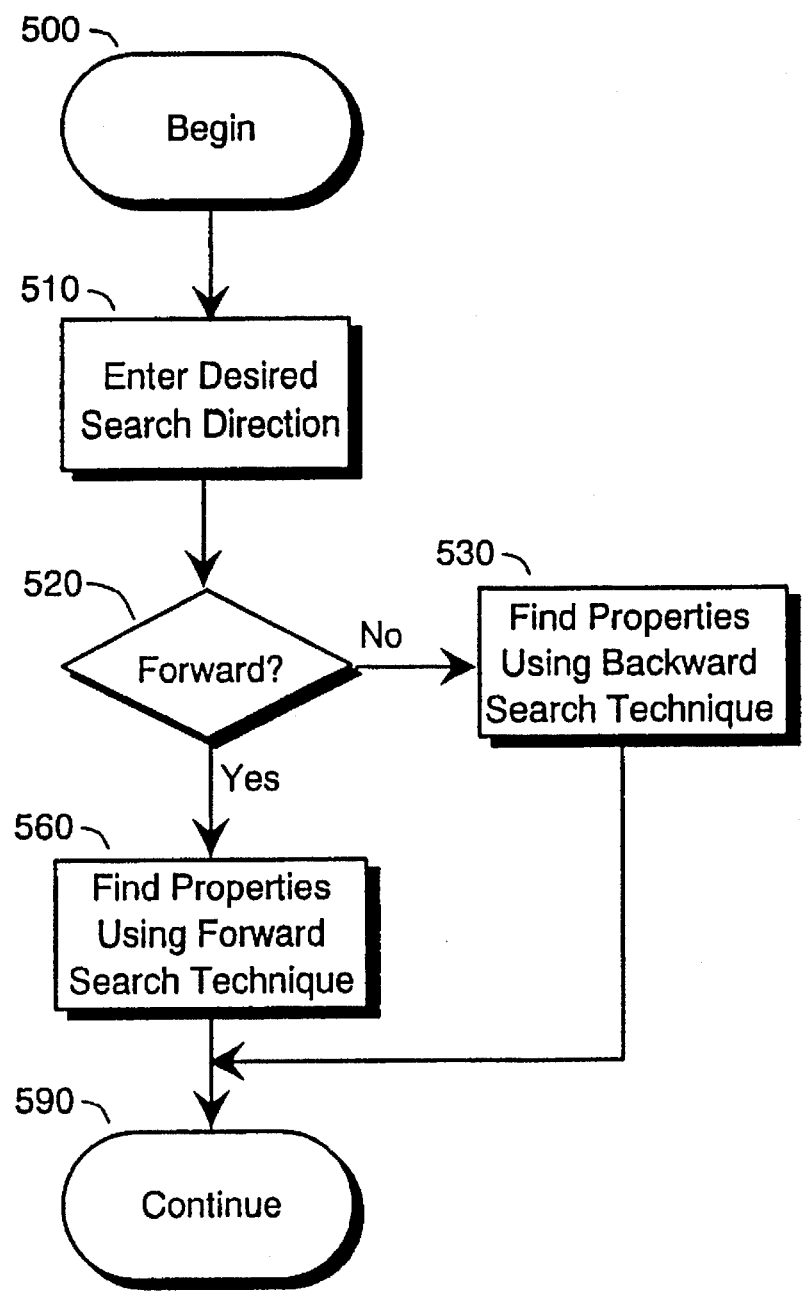
FIG. 11 is a flow chart illustrating the steps comprising the "find and display matching properties 500" block of FIG. 7, showing the method to select either a forward or a backward creation of real estate trade scenarios.

FIG. 11 shows how the determination of the direction of the search for possible matching properties is made. The search direction is critical since it determines how the system looks at the data. In a forward search, the base property's desires are analyzed and compared against the data the in data base, while in a backward search the desires of all of the other properties in the data base are compared against the base property's location. The request for the desired search direction is made after the routine starts in block 500 by block 510. Block 520 determines if the requested search direction was forward and directs the routine to the forward search module in block 560 or if the requested search direction was backward, it directs the routine to the backward search module in block 530. Regardless of the direction taken, once the search modules are complete, the routine exits from block 590.

Figure 12:
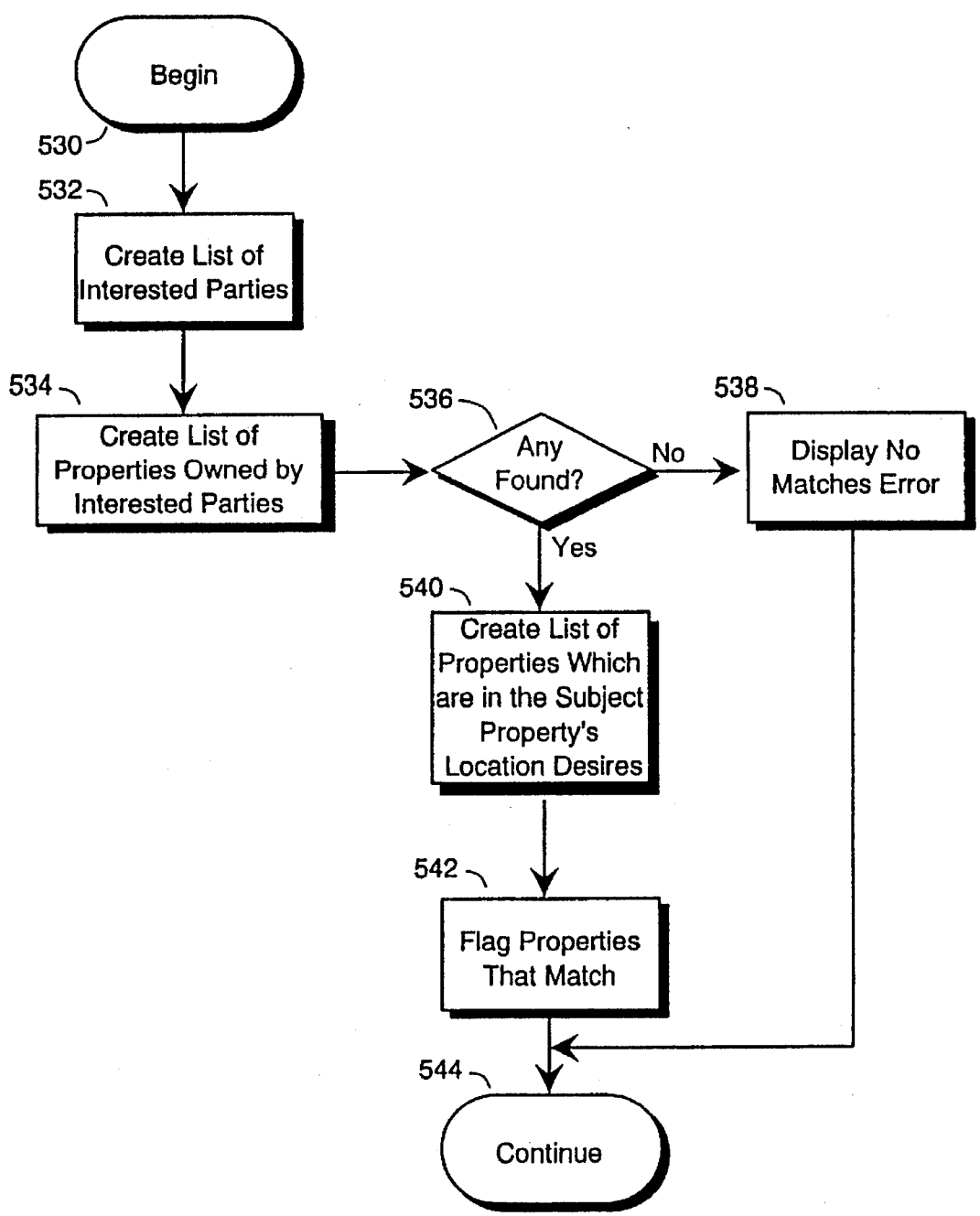
FIG. 12 is a flow chart illustrating the steps comprising the "find properties using backward search technique 530" block of FIG. 11, showing the steps for determining possible interested parties in a real estate trade using the backward search method.

The routine for determining the interested parties using the backward search method is shown in FIG. 12. The first step after starting in block 530 is to determine a comprehensive list of interested parties in block 532 and the properties that are owned by those parties, which are compiled in block 534. If no properties are found whose owners are interested in the current focus property, block 536 directs the program to an error message presented by block 538 and then to the exit of the routine in block 544. If properties are found, the list of properties is then searched by block 540 to determine those located in one of the base property's trade location preferences, and those properties are flagged at block 542 before the routine is exited in block 544.

Figure 13:
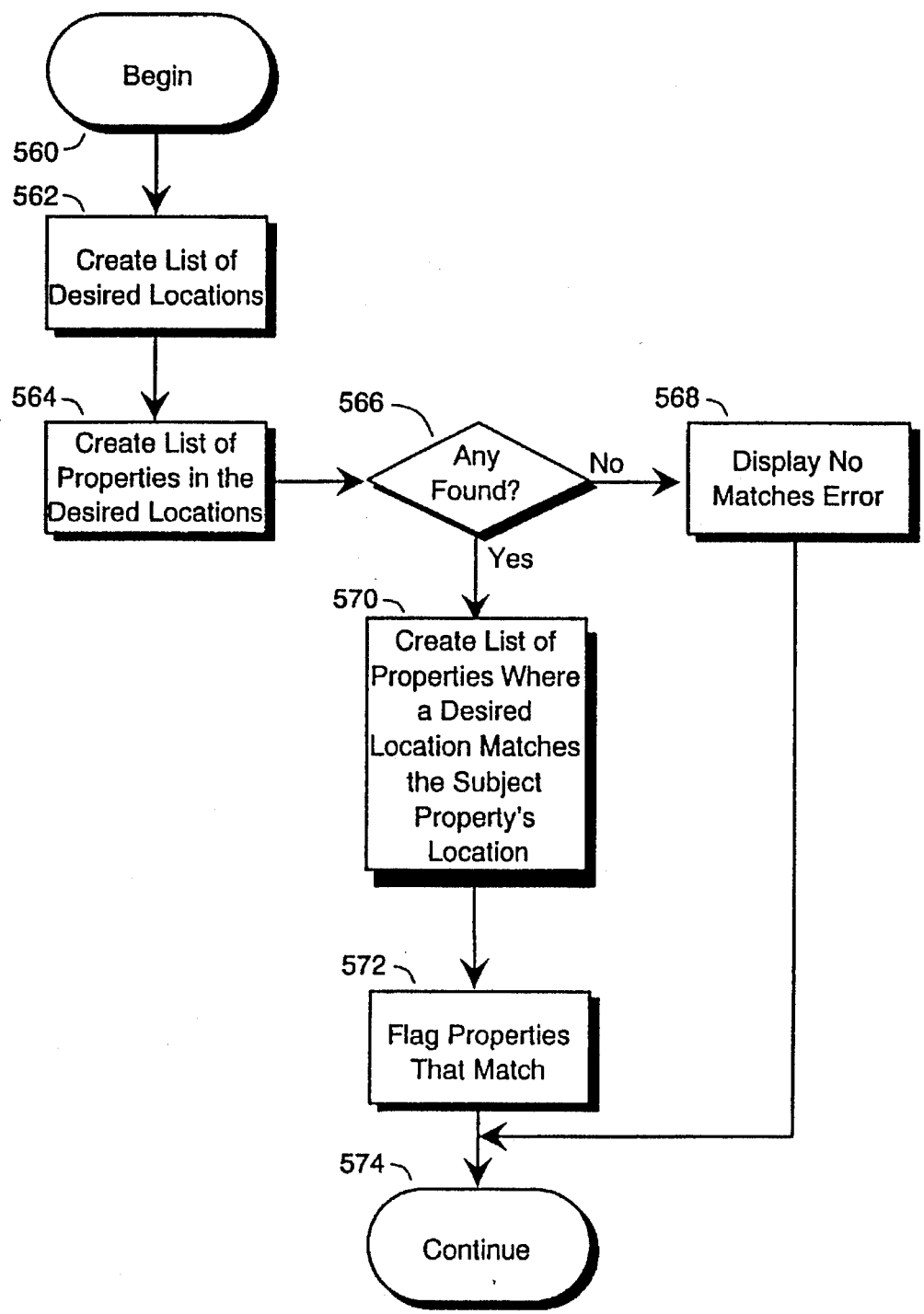
FIG. 13 is a flow chart showing the steps comprising the "find properties using forward search technique 560" block of FIG. 11, showing the steps for determining possible interested parties in a real estate trade using the forward search method.

The routine for determining the interested parties using the forward search method is shown in FIG. 13. The first step after starting in block 560 is to determine a comprehensive list of the desired trade locations in block 562. The properties that are in those locations are compiled in block 564. If no properties are found whose owners are interested in the current focus property, block 566 directs the program to an error message presented by block 568 and then to the exit of the routine in block 574. If properties are found, the list of properties is then searched by block 570 to determine those whose owner has an interest in the subject property's location, and those properties are noted by block 572 before the routine is exited in block 574.

Figure 14:
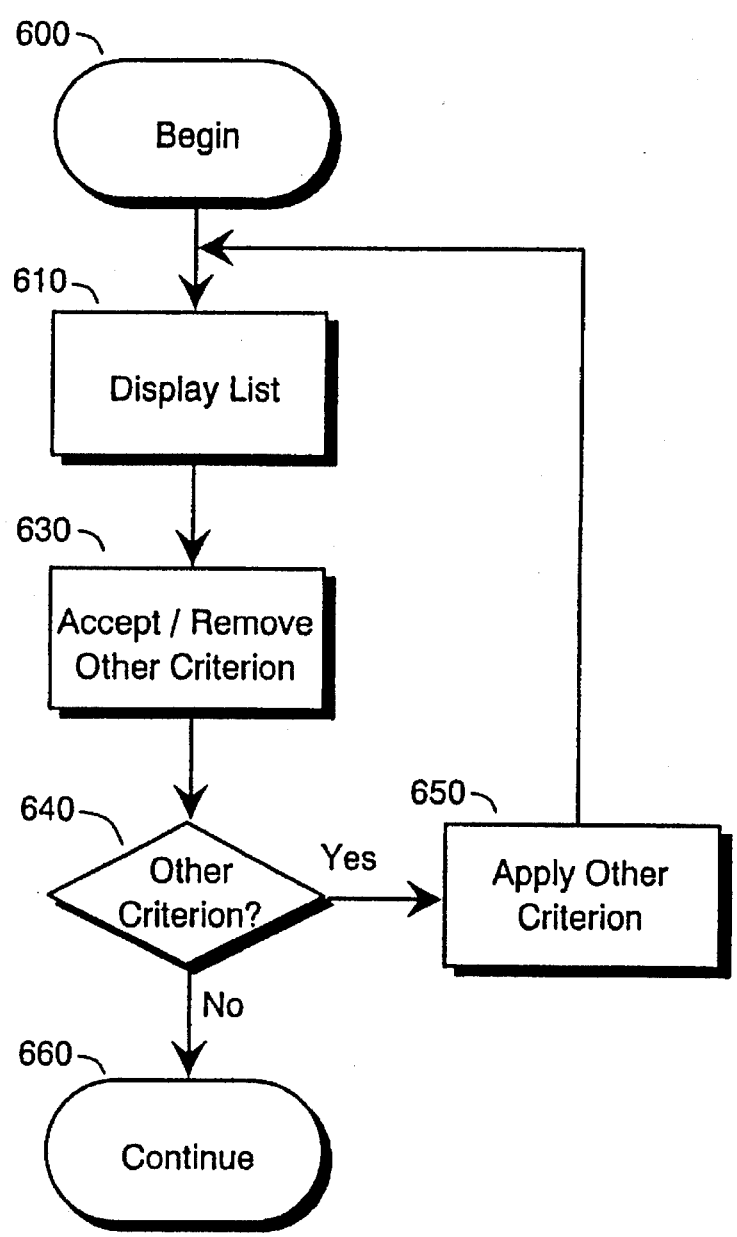
FIG. 14 is a flow chart of the steps comprising the "apply other criteria 600" block illustrated in FIG. 7, showing the steps for displaying selected properties based on additional criteria.

In FIG. 14 the display and the application of additional filtering criteria is presented. After the routine begins with block 600 the current list of selected potential properties for trading are displayed on the screen by block 610. The user is then prompted for any additional tests which should be applied or removed from the list in block 630. If block 640 detects that a change in the tests has been requested, the revised tests are applied by block 650 to the current list of properties and the resulting list is returned to block 610 to be displayed again. If no changes in the tests were requested then the routine continues on with block 660.

Figure 15:
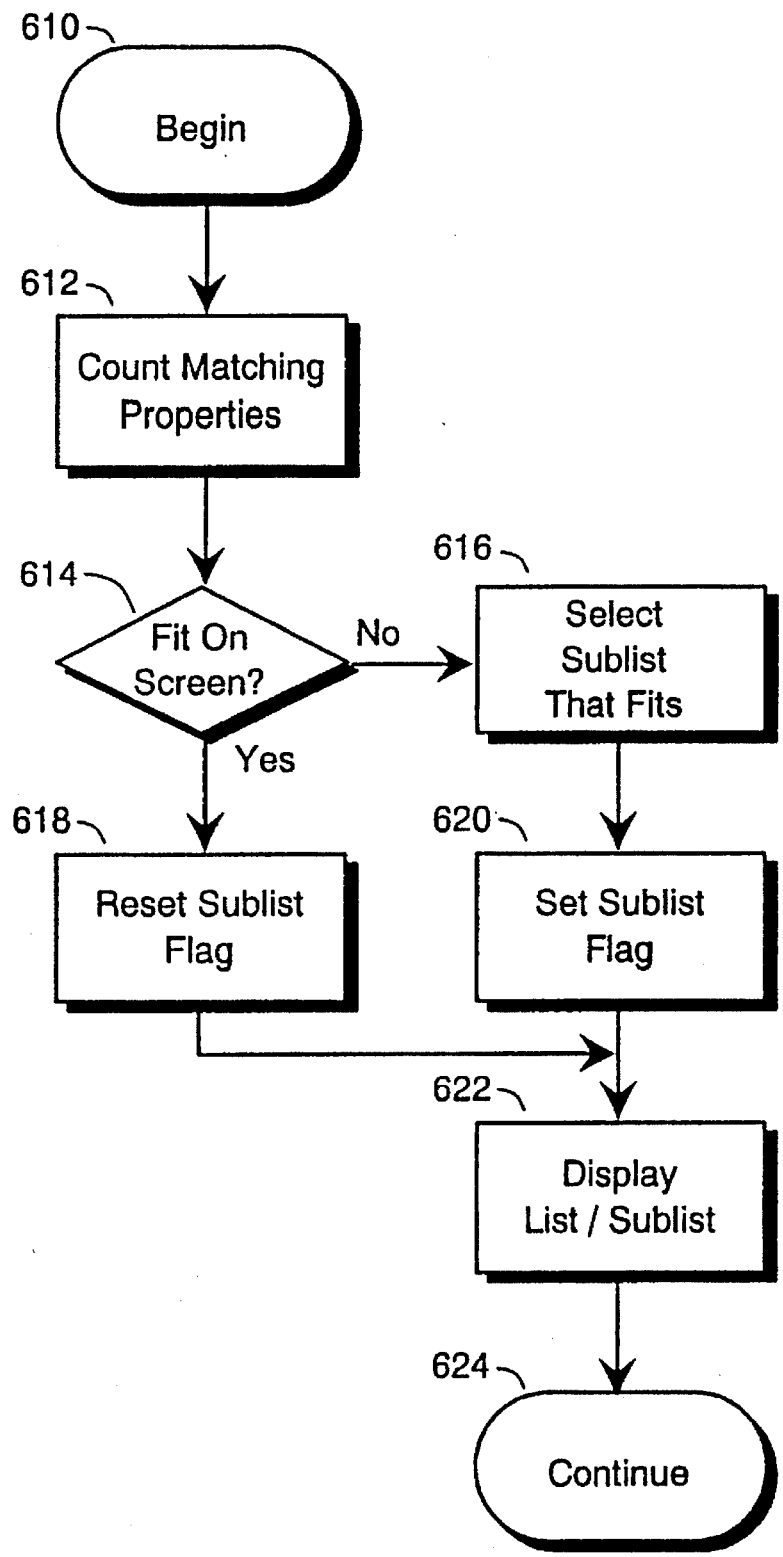
FIG. 15 is a flow chart of the steps comprising the "display list 610" block illustrated in FIG. 14, showing the steps taken to display a list of matched properties.

The support routine shown in FIG. 15 is requested in several locations in the program to display the list of available properties that match the current selection criteria. The start in block 610 is followed by block 612 which calculates the total number of properties to be displayed. If the total is greater than the number able to fit on the screen, block 614 directs the program to block 616 to select a sublist of properties that would fit on the screen and set a sublist indicator in block 620. If the list of properties does fit on the screen at one time, the sublist indicator is reset by block 618. In either case, the resulting list of properties can fit on the screen and is displayed by block 622 and the routine exits through block 624.

Figure 16:
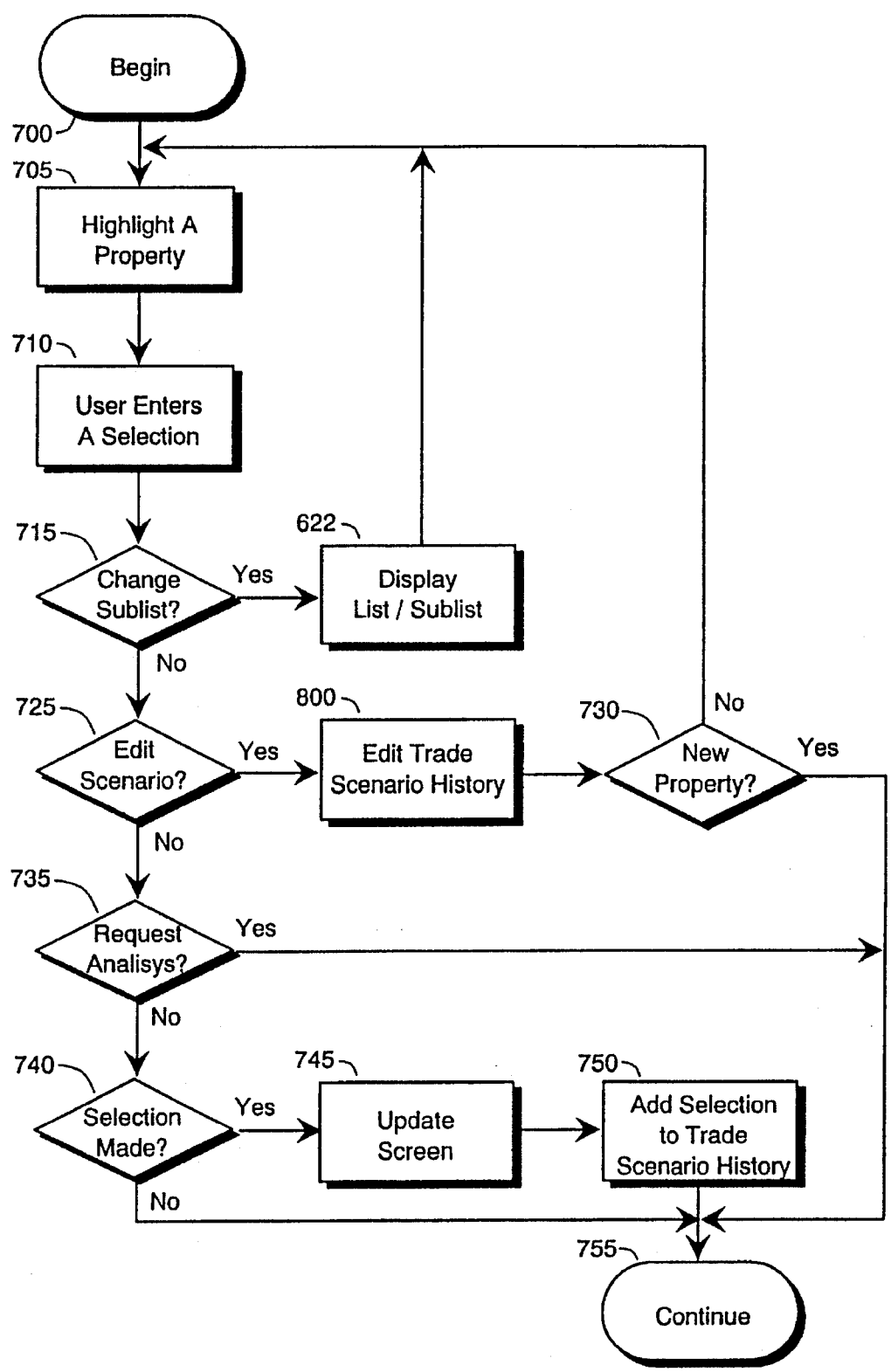
FIG. 16 is a flow chart of the steps comprising the "pick next property 700" block shown in FIG. 7, illustrating the main routine for interaction with the user during the property selection process.

In FIG. 16 the main routine for interaction with the user during the property selection process is presented. This routine is used to allow the user to select a property with block 705 from the possible trade matches and then request an operation to be performed in block 710. The available options include changing the current sublist, editing the current trade scenario, requesting a trade analysis, adding a property to the current trade scenario or exiting. If the requested operation is to change the sublist, block 715 will check to make sure sublists exist and if they do, update the display with block 622 before turning to block 705 to highlight another property. If the requested function is determined by block 725 to edit the trade scenario, block 800 will be performed. If the current property in the trade scenario changes, block 730 will let the routine continue through block 755. If the property does not change, the program returns to highlight another property in block 705. If block 735 determines that the requested function is to perform an analysis with the highlighted property the routine passes on control through block 755. If a property was highlighted and the function was to select the property for the current trade scenario, block 740 will forward the routine to update the screen with block 745 and add the selected property to the trade scenario data base 50 before exiting through block 755. If the exit function is selected, the routine will continue directly to block 755.

Figure 17:
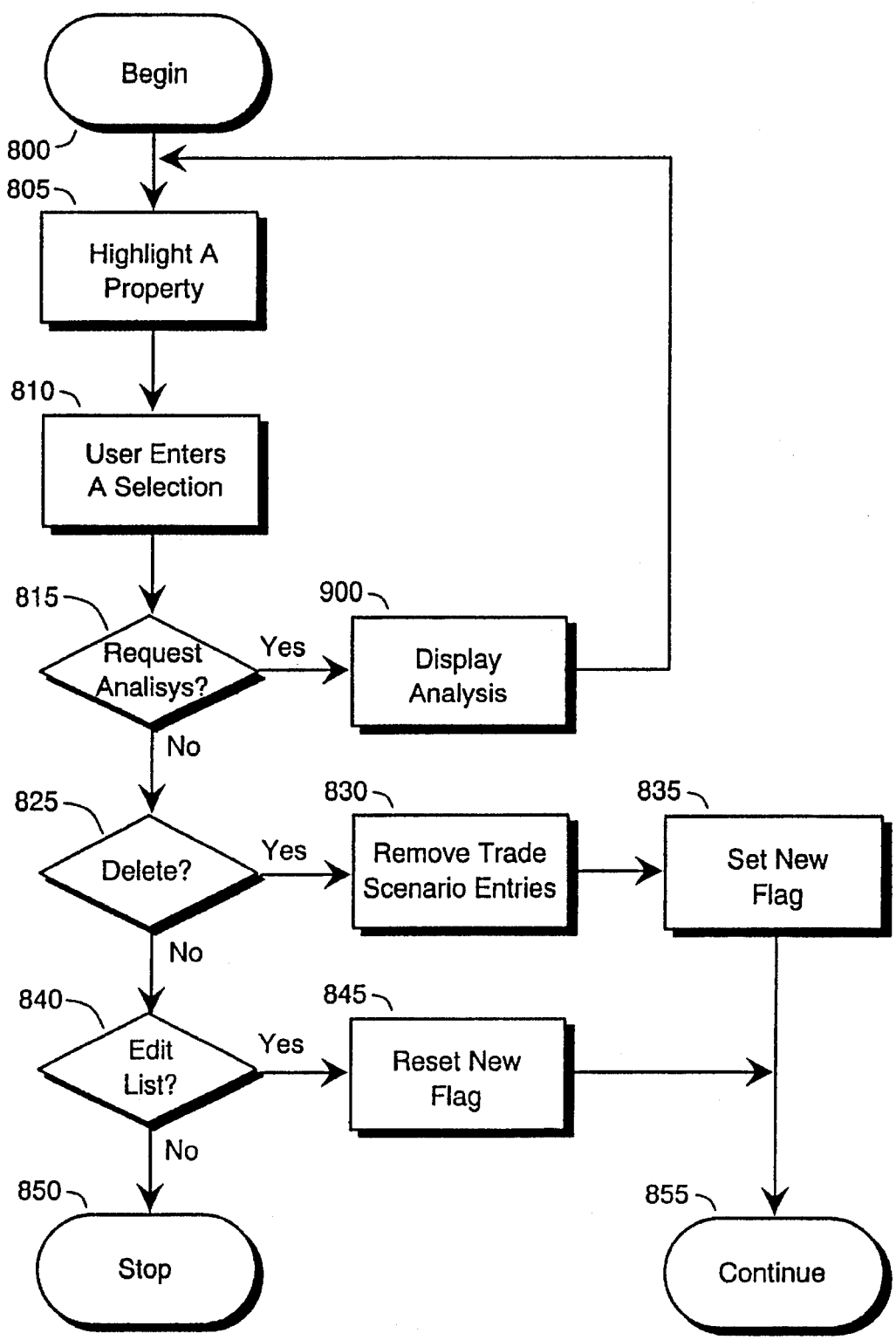
FIG. 17 is a flow chart of the steps taken to edit a currently constructed trade scenario, which is activated during the selection of a new property during the routine shown in FIG. 16.

Next, the detail for the routine allowing editing of the currently constructed trade scenario is shown in FIG. 17. The routine is activated during the selection of a new property by the routine in FIG. 16. The first step is to allow the selection of a property in the trade scenario list with block 805. The user then enters a selection of a function in block 810 from the choices of displaying an analysis, deleting a property from the trade scenario, returning to the property selection routine, or exiting. If an analysis is requested, block 815 will cause block 900 to display an analysis between the currently selected property and the next one on the list. If the function of deleting a property from the trade scenario is requested, the routine will be directed by block 825 to remove the appropriate properties from the trade scenario with block 830, and indicate in block 835 that a new property is to be analyzed for possible matches before exiting through block 855. Block 840 will determine if the function chosen is to return to the property selection routine. Block 845 resets the new property indicator since there were no changes in the trade scenario before exiting through block 855. If block 840 determines that exit was the function selected, the stop block 850 is performed.

Figure 18:
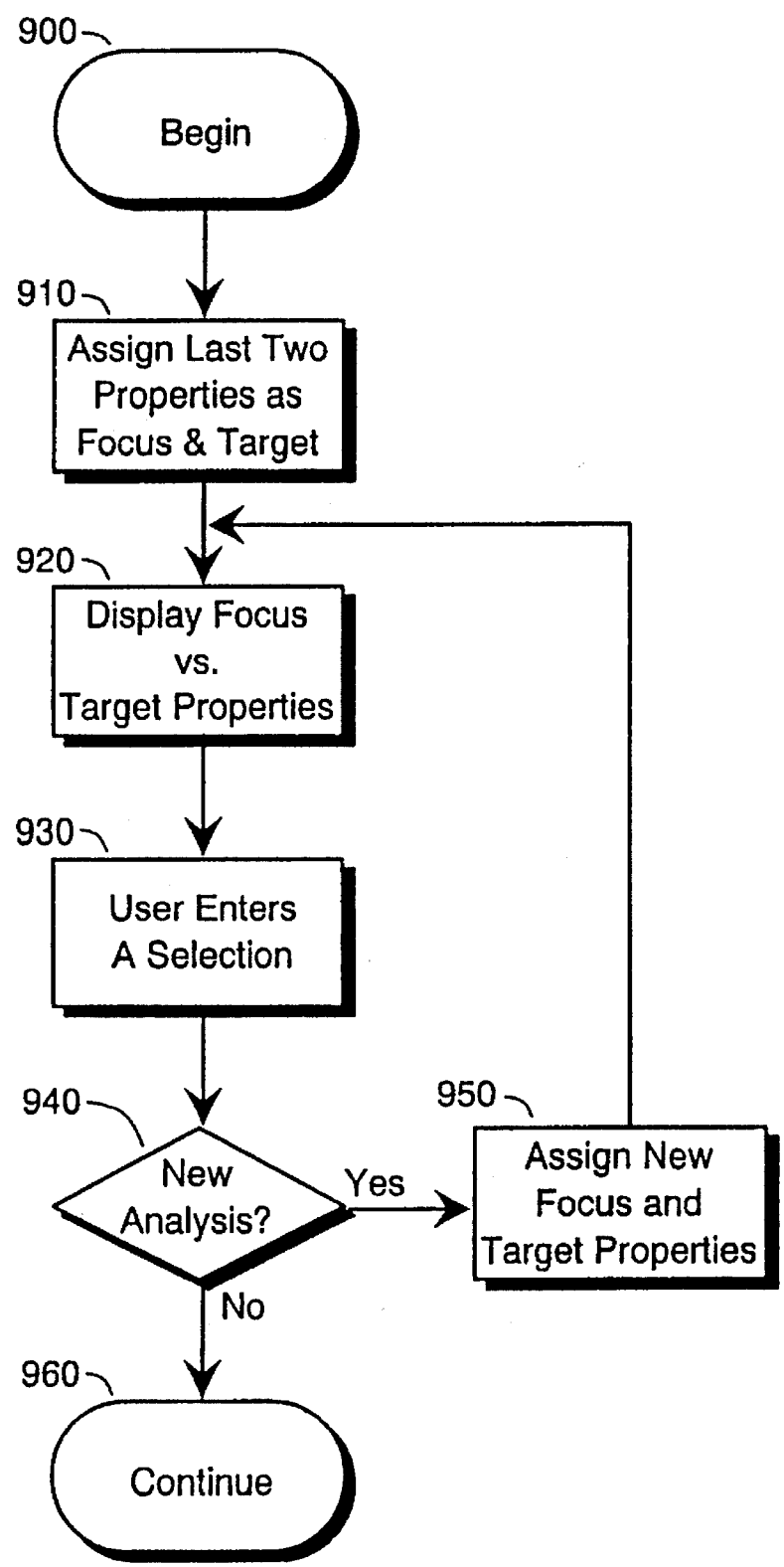
FIG. 18 is a flow chart of the steps comprising the "display analysis 900" block shown in FIG. 7, illustrating the method for displaying an analysis of two selected properties from a real estate trade scenario.

Referring to FIG. 18, the routine for performing and displaying an analysis between any two properties is documented. After beginning in block 900, the focus and target properties are extracted from the client and property data base 54 in block 910 before being calculated and displayed in block 920. The user is then prompted to change the selection in block 930. If another analysis request is determined at block 940, control passes to block 950 where new focus and target properties are assigned and researched before returning to the display block 920. If no new analysis has been requested, the routine exits through block 960.

From the foregoing it is to be appreciated that the present invention involves a method for developing multi-party real property equity exchange scenarios wherein an electronic data base is provided of properties available for trade, which data base includes criteria to be satisfied in order to trade each of the properties within the data base. The electronic data base may be accessed by inputting a base property to be traded and by defining criteria for trading the base property. The base property is then compared against other properties in the electronic data base utilizing either a forward or a backward search technique. Based on this search, possible trade scenarios are created involving the base property and one or more other properties in the electronic data base. These possible trade scenarios are displayed for further analysis by the user who may, if desired, re-define the search criteria to narrow or broaden the scope of the search.

The present invention has broad applicability in the real estate market. By utilizing the present invention, information becomes much more of a liquefier of assets than it has hitherto been. Instead of relying primarily on cash transactions, the present invention permits property owners to utilize their property equity more fully.

Although a particular embodiment of the invention has been described in detail for purposes of illustration, various modifications may be made without departing from the spirit and scope of the invention. Accordingly, the invention is not to be limited, except as by the appended claims.

We claim:

1. An automated process for developing multi-party property equity exchange scenarios, comprising the steps of:

providing an electronic data base of properties available for trade;

accessing the electronic data base of properties utilizing a computer;

identifying a base property within the electronic data base of properties for which a trade is desired;

defining criteria for matching properties in the electronic data base relative to the base property;

comparing properties in the electronic data base utilizing the criteria;

automatically creating possible trade scenarios involving the base property and one or more other properties in the electronic data base utilizing the computer; and displaying the possible trade scenarios.

2. A process as set forth in claim 1, including the step of applying additional criteria for defining possible trade scenarios relative to the base property.

3. A process as set forth in claim 2, wherein when the step of applying additional criteria takes place after the step of displaying the possible trade scenarios, and then the steps of comparing, creating and displaying are repeated.

4. A process as set forth in claim 1, including the step of restricting access to the electronic data base to validated users only.

5. A process as set forth in claim 4, wherein the restricting access step includes the step of requiring the input of an additional property to be traded into the electronic data base prior to permitting access to other properties in the electronic data base.

6. A process as set forth in claim 1, wherein the step of providing an electronic data base of properties includes the step of inputting a purported equity of each of said properties into the data base.

7. A process as set forth in claim 6, wherein the step of providing a data base of properties includes the steps of listing a value of each property and the encumbrances on each property in the data base.

8. A process as set forth in claim 6, including the step of applying additional criteria to a search of properties in the electronic data base after having reviewed all possible trade scenarios in accordance with the original criteria defined.

9. A process as set forth in claim 1, wherein the step of defining criteria includes the step of specifying a desired trade location for each property in the electronic data base.

10. A process as set forth in claim 9, wherein the step of defining criteria includes the step of defining an acceptable equity difference between properties to be matched.

11. A process as set forth in claim 1, wherein the possible trade scenarios are displayed on an electronic screen.

12. A process as set forth in claim 1, wherein the possible trade scenarios are printed.

13. A process as set forth in claim 1, wherein the possible trade scenarios are generated from and transmitted to a remote location via electronic media.

14. A process as set forth in claim 1, wherein the step of comparing the properties in the electronic data base utilizes a forward search technique.

15. A process as set forth in claim 1, wherein the step of comparing the properties in the electronic data base utilizes a backward search technique.

16. A computerized process for developing multi-party real property equity exchange scenarios, comprising the steps of:

providing an electronic data base of properties available for trade, including criteria to be satisfied in order to trade each said property;

utilizing a computer, accessing the electronic data base by inputting a base property to be traded and by defining criteria for trading said base property;

comparing the base property against other properties in the electronic data base;

automatically creating possible trade scenarios involving the base property and one or more other properties in the electronic data base utilizing the computer; and displaying said possible trade scenarios.

17. A process as set forth in claim 16, including the steps of further defining the trade criteria for the base property after viewing a display of the possible trade scenarios.

18. A process as set forth in claim 17, including the steps of re-comparing the base property against other properties in the electronic data base, re-creating possible trade scenarios involving the base property and one or more other properties in the electronic data base, and then re-displaying said possible trade scenarios, after further defining the search criteria for the base property.

19. A process as set forth in claim 16, including the step of restricting access to the electronic data base to validated users only.

20. A process as set forth in claim 16, wherein the step of providing an electronic data base includes the steps of listing a value for each property and the encumbrances on each property in the data base for purposes of calculating a purported equity of each of said properties in the data base.

21. A process as set forth in claim 20, including the step of applying additional criteria to a search of properties in the electronic data base after having reviewed all possible trade scenarios in accordance with the original criteria defined.

22. A process as set forth in claim 18, wherein the step of providing criteria to be satisfied in order to trade each said property in the electronic data base, includes the step of specifying a desired trade location for each said property and defining an acceptable equity difference between properties to be matched.

23. A process as set forth in claim 22, wherein the step of comparing the properties in the electronic data base utilizes a forward search technique.

24. A process as set forth in claim 22, wherein the step of comparing the properties in the electronic data base utilizes a backward search technique.

25. A process as set forth in claim 16, wherein the step of accessing the electronic data base is accomplished utilizing electronic transmissions from a remote location.

26. A process as set forth in claim 18, including the step of electronically recording said possible trade scenarios.

27. A process as set forth in claim 26, including the steps of accessing the recorded possible trade scenarios and thereafter re-defining the trade criteria for the base property, re-comparing the base property against other properties in the electronic data base, re-creating possible trade scenarios involving the base property and one or more other properties in the electronic data base, and then re-displaying said possible trade scenarios.

28. An automated process for developing multi-party property equity exchanges, the steps comprising:

identifying a base property to be traded;

establishing criteria to be met for trading the base property;

accessing an electronic data base of properties available for trade, including criteria to be satisfied in order to trade each said property;

utilizing a computer to search the electronic data base to establish matches between properties within the electronic data base, and the base property and properties within the electronic data base, in accordance with the established trade criteria for each; and analyzing the search results for possible trade scenarios involving the base property and one or more other properties in the electronic data base.

29. A process as set forth in claim 28, wherein the step of establishing criteria for trading the base property includes the steps of specifying a desired trade location and defining an acceptable equity difference between properties to be matched.

30. A process as set forth in claim 29, including the steps of listing a value for each property and the encumbrances on each property in the data base.

31. A process as set forth in claim 30, including the step of specifying a desired trade location for each property in the electronic data base.

32. A process as set forth in claim 30, including the step of defining an acceptable equity difference between properties in the data base to be matched.

33. A process as set forth in claim 28, wherein the electronic database searching step includes the steps of comparing the base property against other properties in the electronic data base, and creating possible trade scenarios involving the base property and one or more other properties in the electronic data base.

34. A process as set forth in claim 33, wherein the analyzing step includes the steps of displaying said possible trade scenarios, further defining the trade criteria for the base property after viewing a display of the possible trade scenarios, re-comparing the base property against other properties in the electronic data base, re-creating possible trade scenarios involving the base property and one or more other properties in the electronic data base, and then displaying new possible trade scenarios for re-analysis.

35. A process as set forth in claim 33, including the step of electronically recording said possible trade scenarios.

36. A process as set forth in claim 35, including the steps of accessing the recorded possible trade scenarios and thereafter re-defining the trade criteria for the base property, re-comparing the base property against other properties in the electronic data base, re- creating possible trade scenarios involving the base property and one or more other properties in the electronic data base, and then re-displaying new possible trade scenarios.

37. A process a s set forth in claim 28, wherein the step of accessing the electronic data base is accomplished utilizing electronic transmissions from a remote location.

38. An automated process for developing multi-party real property equity exchanges, the steps comprising:

identifying a base property to be traded;

establishing criteria to be met for trading the base property, including specifying a desired trade location and defining an acceptable equity difference between properties to be matched;

providing an electronic data base of properties available for trade, including criteria to be satisfied in order to trade each said property, the electronic data base including, for each property listed therein, an equity value for each property, a desired trade location for the owner, and an acceptable equity difference between properties to be matched;

accessing the electronic data base by inputting data relating to the base property;

utilizing a computer to search the electronic data base to establish matches between properties within the electronic data base, and the base property and properties within the electronic data base, in accordance with the established trade criteria for each;

creating possible trade scenarios involving the base property and one or more other properties in the electronic data base;

electronically recording said possible trade scenarios; and analyzing the search results, including the steps of displaying said possible trade scenarios, further defining the trade criteria for the base property after viewing a display of the possible trade scenarios, re-comparing the base property against other properties in the electronic data base and re-creating possible trade scenarios involving the base property and one or more other properties in the electronic data base utilizing the computer, and then displaying new possible trade scenarios for re-analysis.

39. A process as set forth in claim 38, wherein the step of searching the electronic data base utilizes either a forward or backward search technique.

40. A process as set forth in claim 38, wherein the step of accessing the electronic data base is accomplished utilizing electronic transmissions from a location remote from the date base.

* * * * *